United States Patent Office 3,121,903
Patented Feb. 25, 1964

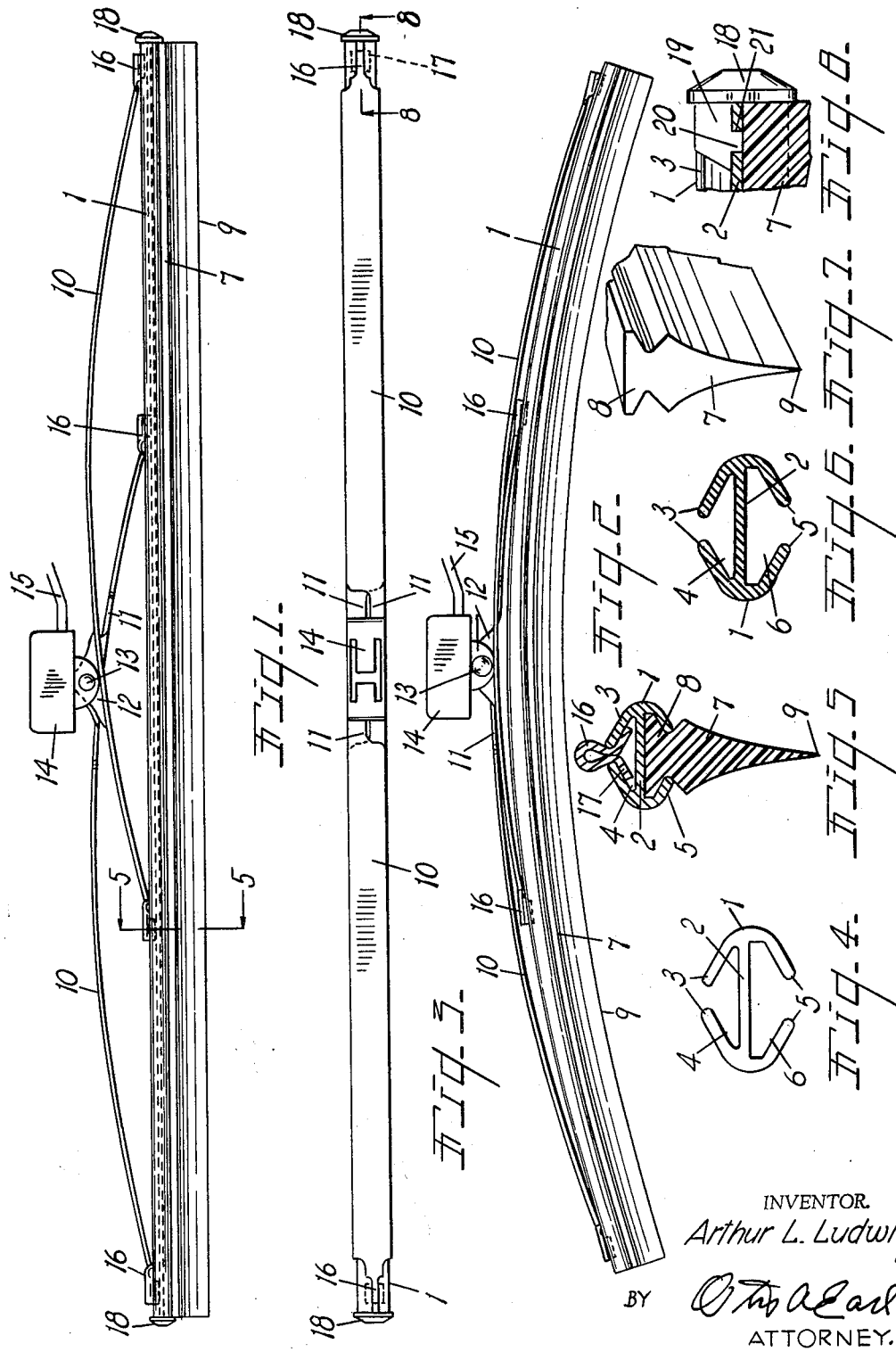

3,121,903
WINDSHIELD WIPER
Arthur L. Ludwig, Hastings, Mich., assignor to Hastings Manufacturing Company, Hastings, Mich.
Filed Apr. 4, 1963, Ser. No. 270,679
15 Claims. (Cl. 15—250.42)

This invention relates to improvements in windshield wipers. The main objects of this invention are:

First, to provide a windshield wiper which effectively conforms to surfaces of substantially varying shape over which it may be translated in a single use stroke.

Second, to provide a windshield wiper assembly in which the blade and the blade supporting or holding members are formed of nonmetallic material.

Third, to provide a wiper assembly having these advantages in which the parts or elements may be economically produced and assembled.

Fourth, to provide a structure having these advantages in which the only pivotal connection is for the assembled unit to the actuating arm coupling.

Objects relating to details and economies of the invention will appear from the description to follow. The invention is defined and pointed out in the claims.

A preferred embodiment of the invention is illustrated in the accompanying drawing, in which:

FIG. 1 is a side elevational view of a windshield wiper embodying my invention, a fragment only of the actuating arm being illustrated and that conventionally.

FIG. 2 is a side elevational view corresponding to that of FIG. 1 with the wiper as it would be conformed in use to a curved surface. This also illustrates that the support members vary in relationship to each other as the blade is being operated on a surface other than a flat surface.

FIG. 3 is a plan view of the structure shown in FIG. 1 with the actuating arm omitted.

FIG. 4 is an enlarged end elevation of the body member or blade supporting and coupling member.

FIG. 5 is an enlarged sectional view on a line corresponding to line 5—5 of FIG. 1.

FIG. 6 is an enlarged sectional view of the blade body member corresponding to that shown in FIG. 5.

FIG. 7 is an enlarged end perspective fragmentary view of the wiper blade.

FIG. 8 is an enlarged fragmentary view on a line corresponding to line 8—8 of FIG. 3.

In the accompanying drawing, while I have illustrated my invention as embodied in a wiper unit adapted for use on the windshield of a motor vehicle, it should be understood that it is also adaptable for use on airplanes and the like. In many motor vehicles, the portion of the windshield over which the wiper passes in a single stroke varies substantially.

The embodiment of my invention illustrated comprises the blade body or support member 1 which is desirably formed of thermoplastic material and comprises an intermediate base portion 2 of substantial width and of substantially uniform cross section or thickness from end to end thereof. It includes or has a pair of outwardly converging flanges 3 coacting with the body member to form a groove 4 of dovetail cross section and a pair of inwardly converging flanges 5 coacting to form a dovetail groove 6. These flanges extend from end to end of the body member.

The body member in the preferred commercial embodiment is formed of thermoplastic material and the several parts are of uniform thickness from end to end of the body member. This body member is flexible in the direction of the flanges but is substantially rigid or nonflexible in lateral direction.

The flexibly resilient wiper blade 7 has a dovetail outer supporting portion 8 fittingly and supportedly engaged within the inwardly projecting flanges 5; see FIG. 5. This wiper blade is desirably formed of rubber or suitable thermoplastic material and has a relatively sharp tip 9 adapted to wipingly engage the surface over which the blade is swung. Blades are commonly called "squeegees" in these wiper assemblies.

The support members 10 are formed of flat springable steel stock and are formed to provide cut away interlapping portions 11 provided with outwardly projecting integral ears 12 which are connected by the pivot 13 to the coupling member 14 to which the wiper or actuating arm 15, conventionally illustrated in FIGS. 1 and 2, is secured.

The details of the coupling means are substantially that illustrated in my application for Patent Serial No. 204,306 filed June 20, 1962.

The support members 10 terminate at their ends in coupling members 16 integral therewith, the ends being folded into loop-like portions as illustrated in FIG. 5 and have laterally projecting flanges 17 disposed within and in clamping engagement with the flanges 3 of the blade body member. It will be understood that while parts are in clamping engagement to prevent lateral movement of the blade body member relative to these arms, there is some relatively slight movement of these coupled ends with the blade body member when the blade is bent, for example as is illustrated in FIG. 2.

In assembling, the blade is as stated desirably engaged with the body member in relatively longitudinal movement and the body member and the arms are desirably engaged by relatively longitudinal movement. Disengagement of the body member with the supporting member is prevented by means of the end members 18 which have inwardly projecting lugs 19 slidably engaged between the edges of the flanges 3 at the ends thereof and supportedly engaged therewith, these lugs 19 being provided with detent portions 20 in keeper openings 21 provided therefor in the body portion 2 of the blade body member, see FIG. 8.

With this arrangement of parts, the only pivot in the assembly is the pivot 13 which connects the resilient support members 10 and provides a connection therefor to the actuating arm 15.

As stated, the blade body member is desirably formed of nonmetallic material and as a unitary element. It will be understood that it might be formed of other than molded material.

In the accompanying drawing the applicant has illustrated the preferred embodiment of his invention but it should be understood that there may be modifications or other embodiments in which the support members for the blade body member may be varied. For example they may be substantially nonspringable although the springable feature of the embodiment illustrated is desirable and also their pivotal connection to each other and to the supporting or drive arm. The connection for the support members to the blade body member is desirably substantially as illustrated and described.

I have illustrated and described my invention in a highly practical embodiment thereof. I have not attempted to illustrate various use adaptations as it is believed this disclosure will enable those skilled in the art to embody or adapt my invention as may be desired.

Having thus described the invention, what is claimed as new and desired to secure by Letters Patent is:

1. A windshield wiper assembly comprising a unitary elongated blade body member formed of thermoplastic material and comprising an intermediate portion of substantial width and of substantial uniform cross section from end to end thereof and a pair of inwardly converging and a pair of outwardly converging flange-like portions projecting from the edges of said intermediate portion and defining inwardly and outwardly facing grooves of dovetailed section, a flexibly resilient wiper blade having a dovetail support portion fittingly and supportingly engaged in said inwardly facing groove of said blade body member, a coacting pair of outwardly bowed springably resilient support members of flat cross section disposed in interlapping cross relation and pivotally connected, said support members terminating at their ends in integral coupling members disposed within and in slidable supporting engagement with said outer flanges of said blade body member, the outer ends of said support members being disposed adjacent but in inwardly spaced relation to the outer ends of said blade body member, an actuating arm coupling member pivotally engaged with said pivotal connection for said support members, and end members for said blade body member disposed in supported engagement with the ends thereof and with portions thereof overlapping the ends of said wiper blade, said end members having inwardly projecting lugs supportingly engaged in said outer groove of said blade body member and having detents interlockingly engaged with said intermediate portion of said blade body member.

2. A windshield wiper assembly comprising a unitary elongated blade body member formed of thermoplastic material and comprising an intermediate portion of substantial width and of substantial uniform cross section from end to end thereof and a pair of inwardly converging and a pair of outwardly converging flange-like portions projecting from the edges of said intermediate portion and defining inwardly and outwardly facing grooves of dovetailed section, a fixedly resilient wiper blade having a dovetail support portion fittingly and supportingly engaged in said inwardly facing groove of said blade body member, a coacting pair of outwardly bowed springably resilient support members of flat cross section disposed in interlapping crossing relation and pivotally connected, said support members terminating at their ends in integral coupling members disposed within and in slidable supporting engagement with said outer flanges of said blade body member, the outer ends of said support members being disposed adjacent but in inwardly spaced relation to the outer ends of said blade body member, and an actuating arm coupling member pivotally engaged with said pivotal connection for said support members.

3. A windshield wiper assembly comprising a unitary elongated blade body member formed of thermoplastic material and comprising an intermediate portion of substantial width and of substantial uniform cross section from end to end thereof and a pair of inwardly converging and a pair of outwardly converging flange-like portions projecting from the edges of said intermediate portion and defining inwardly and outwardly facing grooves of dovetailed section, a flexibly resilient wiper blade having a dovetail support portion fittingly and supportingly engaged in said inwardly facing groove of said blade body member, pivotally connected support members terminating at their ends in integral coupling members disposed in supporting engagement with said outer flanges of said blade body member, the outer ends of said support members being disposed adjacent the outer ends of said blade body member, and end members for said blade body member disposed in supported engagement with the ends thereof and with portions thereof overlapping the ends of said wiper blade, said end members having inwardly projecting lugs supportingly engaged in said outer groove of said blade body member and having detents interlockingly engaged with said intermediate portion of said blade body member.

4. A windshield wiper assembly comprising a unitary elongated blade body member formed of thermoplastic material and comprising an intermediate portion of substantial width and of substantial uniform cross section from end to end thereof and a pair of inwardly converging and a pair of outwardly converging flange-like portions projecting from the edges of said intermediate portion and defining inwardly and outwardly facing grooves of dovetailed section, a flexibly resilient wiper blade having a dovetail support portion fittingly and supportingly engaged in said inwardly facing groove of said blade body member, a coacting pair of springably resilient support members disposed in interlapping crossing relation and pivotally connected, said support members terminating at their ends in integral coupling members disposed in supporting engagement with said outer flanges of said blade body member, the outer ends of said support members being disposed adjacent the outer ends of said blade body member, and an actuating arm coupling member pivotally engaged with said pivotal connection for said support members.

5. A windshield wiper assembly comprising an elongated blade body member formed of springably resilient material and comprising an intermediate portion of a width substantially exceeding its thickness, a pair of converging flange-like portions projecting inwardly from said intermediate portion and a pair of converging flange-like portions projecting outwardly from said intermediate portion, said converging flange-like portions coacting with said intermediate portion to prevent substantial lateral flexing of said blade body member while permitting flexing thereof in the direction of the flanges, a flexibly resilient wiper blade retainingly engaged within said inwardly projecting flanges of said blade body member, coacting outwardly bowed pivotally connected springably resilient support members of flat cross section disposed in interlapping relation and terminating at their ends in coupling elements having portions thereof supportingly and slidably engaged with said outer flange-like portions, actuating means pivotally connected to said pivotal connection for said support members, and end members for said blade body member detachably engaged therewith and having portions overlapping the end portions of said blade engaged with said blade body member.

6. A windshield wiper assembly comprising an elongated blade body member formed of springably resilient material and comprising an intermediate portion of a width substantially exceeding its thickness, a pair of converging flange-like portions projecting inwardly from said intermediate portion and a pair of converging flange-like portions projecting outwardly from said intermediate portion, said converging flange-like portions coacting with said intermediate portion to prevent substantial lateral flexing of said blade body member while permitting flexing thereof in the direction of the flanges, a flexibly resilient wiper blade retainingly engaged within said inwardly projecting flanges of said blade body member, coacting pivotally connected support members disposed in interlapping relation and terminating at their ends in coupling elements having portions thereof supportingly and slidably engaged with said outer flange-like portions, actuating means connected to said support members, and end members for said blade body member detachably engaged therewith and having portions of said blade engaged with said blade body member.

7. A windshield wiper assembly comprising an elongated blade body member formed of springably resilient material and comprising an intermediate portion of a width substantially exceeding its thickness, a pair of converging flange-like portions projecting inwardly from said intermediate portion and a pair of converging flange-like portions projecting outwardly from said intermediate portion, said converging flange-like portions coacting with said intermediate portion to prevent substantial lateral flexing of said blade body member while permitting flexing thereof in the direction of the flanges, a flexibly resilient wiper blade retainingly engaged within said inwardly projecting flanges of said blade body member, pivotally connected support members terminating at their ends in coupling elements having portions thereof supportingly and slidably engaged with said outer flange-like portions, and actuating means connected to said support members.

8. A windshield wiper assembly comprising an elongated blade body member formed of springably resilient material and comprising an intermediate portion of a width substantially exceeding its thickness, a pair of converging flange-like portions projecting inwardly from said intermediate portion and a pair of converging flange-like portions projecting outwardly from said intermediate portion, said converging flange-like portions coacting with said intermediate portion to prevent substantial lateral flexing of said blade body member while permitting flexing thereof in the direction of the flanges, a flexibly resilient wiper blade retainingly engaged within said inwardly projecting flanges of said blade body member, coacting outwardly bowed pivotally connected springably resilient support members disposed in interlapping relation and terminating at their ends in coupling elements having portions thereof supportingly and slidably engaged with said outer flange-like portions, and actuating means pivotally connected to said pivotal connection for said support members.

9. A windshield wiper assembly comprising a blade body member having converging inwardly projecting flange-like portions and converging outwardly projecting flange-like portions, a wiper blade retainingly engageable within said inwardly projecting flange-like portions of said body member when presented endwise thereto, coacting pivotally connected springably resilient support members terminating at their ends in coupling elements supportingly and retainingly engaged with said outwardly projecting flanges of said blade body member, and end members for said blade body member, at least one of which is detachably engageable therewith and closing the end portions of said blade body member with which said blade is engaged.

10. A windshield wiper assembly comprising a blade body member having converging inwardly projecting flange-like portions and converging outwardly projecting flange-like portions, a wiper blade retainingly engageable within said inwardly projecting flange-like portions of said body member when presented endwise thereto, coacting pivotally connected springably resilient support members terminating at their ends in coupling elements supportingly and retainingly engaged with said outwardly projecting flanges of said blade body member.

11. A windshield wiper assembly comprising a blade body member having converging inwardly projecting flang-like portions and converging outwardly projecting flange-like portions, a wiper blade engaged in said inwardly projecting flange-like portions of said body member, coacting pivotally connected springably resilient support members terminating at their ends in coupling elements supportingly and retainingly engaged with said outwardly projecting flanges of said blade body member, and end members for said blade body member, at least one of which is detachably engageable therewith and closing the end portions of said blade body member with which said blade is engaged.

12. A windshield wiper assembly comprising a blade body member having converging inwardly projecting flange-like portions and converging outwardly projecting flange-like portions, a wiper blade engaged in said inwardly projecting flange-like portions of said body member, and coacting pivotally connected springably resilient support members terminating at their ends in coupling elements supportingly and retainingly engaged with said outwardly projecting flanges of said blade body member.

13. A windshield wiper assembly comprising a blade body member having converging inwardly projecting flange-like portions and converging outwardly projecting flange-like portions, a wiper blade engaged with said inwardly projecting flange-like portions of said body member and coacting support members terminating at their ends in coupling elements supportedly and retainingly engaged in said outwardly projecting flanges of said blade body member, the blade body member engaging portions of said support members being substantially uniformly spaced.

14. A windshield wiper assembly comprising a blade body member having converging inwardly projecting flange-like portions and converging outwardly projecting flange-like portions, a wiper blade engaged with said inwardly projecting flange-like portions of said body member and coacting support members terminating at their ends in coupling elements supportedly and retainingly engaged in said outwardly projecting flanges of said blade body member.

15. A windshield wiper assembly comprising a body member having converging inwardly projecting flange-like portions and converging outwardly projecting flange-like portions, a wiper blade retainingly engageable within said inwardly projecting flange-like portions of said body member, and support members having coupling elements supportingly and retainingly engaged in said outwardly projecting flanges of said blade body member.

References Cited in the file of this patent
UNITED STATES PATENTS

| | | |
|---|---|---|
| 2,706,305 | Oishei | Apr. 19, 1955 |
| 2,741,792 | Ehrlich et al. | Apr. 17, 1956 |
| 2,782,442 | Krohm | Feb. 26, 1957 |

FOREIGN PATENTS

| | | |
|---|---|---|
| 707,559 | Great Britain | Apr. 21, 1954 |